United States Patent
Gievers

[15] 3,692,385
[45] Sept. 19, 1972

[54] ROTATION SENSITIVE RETARDER SYSTEM

[72] Inventor: John George Gievers, 245 Wimpole Drive, Rochester, Mich. 48063

[22] Filed: June 1, 1970

[21] Appl. No.: 41,849

[52] U.S. Cl.............350/157, 350/147, 356/106 R
[51] Int. Cl.................................................G02f 1/24
[58] Field of Search...350/147, 150, 157; 356/106 R, 356/106 LR; 331/94.5

[56] References Cited

UNITED STATES PATENTS

| | | |
|---|---|---|
| 3,512,890 | 5/1970 | McLaughlin........356/106 RL |
| 3,395,270 | 7/1968 | Speller................356/106 RL |
| 3,486,130 | 12/1969 | Macek..................350/157 X |
| 3,432,223 | 3/1969 | Uchida.................350/157 X |
| 3,511,556 | 5/1970 | Amman....................350/157 |
| 3,463,924 | 8/1969 | Culshaw et al.........356/106 R |
| 2,745,316 | 5/1956 | Sziklai..................350/157 X |

OTHER PUBLICATIONS

Shurcliff et al., Polarized Light (D. Van Nostrand Company, Inc. Princeton, New Jersey, 1964) Chapter 5, " Polarizers of the Double Refraction Type" p. 42-53
Shultz, " A Low Loss Polarizing Prism" Applied Optics Vol. 8, No. 5 (May, 1969) p. 1068
Block, " Elliptical Polarizer" J.O.S.A. Vol. 50, No. 4 (Apr. 1960) p. XIV
Okoomian, " A Two-Beam Polarization Technique to Measure Optical Phase" Applied Optics Vol. 8, No. 11 (Nov. 1969) pp. 2363- 2365

*Primary Examiner*—David Schonberg
*Assistant Examiner*—Paul R. Miller
*Attorney*—Barnes, Kisselle, Raisch & Choate

[57] ABSTRACT

A rotation sensitive retarder system comprising an optical loop around which two orthogonal linear polarized light beams are guided in opposite directions. A splitting and reunifying device is utilized in the optical loop for producing two orthogonal components and reunifying the components. Rotation in inertial space produces polarization-form convertion in the reunified beam which then is analyzed to determine the extent of the rotation.

37 Claims, 12 Drawing Figures

INVENTOR
John G. Gievers

INVENTOR
John G. Gievers

BY
Barnes, Kisselle, Raisch & Choate
ATTORNEYS

INVENTOR
John G. Gievers

ROTATION SENSITIVE RETARDER SYSTEM

This invention relates to rotation sensor systems such as are used in guidance and navigation devices.

BACKGROUND OF THE INVENTION

Guidance and navigation devices have reached a high degree of perfection. This holds even more true with the carriers, the marine, aeronautical and astronautical vehicles on which inertial systems play a vital role for their guidance and navigation. The spectacular advances of these vehicles in general performance, speed and capacity demand in return continues further improvements of the inertial systems they carry.

If the development of a technical instrument has been ameliorated to a certain level of perfection further improvements become increasingly more difficult, in particular, if the desired improvements are in conflict with inherent natural laws and physical properties of the vital components in the system. In a guidance and navigation system the most vital component is the rotation sensor, which senses angular deviations in inertial space.

The classical rotation sensor which has been in use for more than half a century and which, over the years, has been developed to great perfection, is the flywheel gyro. Its performance is based on Newton's laws of motion.

The use of a fast spinning flywheel excludes from the very beginning certain solutions and desired characteristics. It is obvious that with a flywheel gyro, a solid state navigation system is not feasible. Because the flywheel always has to have a certain weight it is not easy to design a gyro which can operate in a high acceleration environment, where more than 100g prevail, as is required in some applications. A system equipped with conventional mass gyros always will be vulnerable to shock and vibrations, which often cannot be eliminated. In addition, other difficulties such as oscillations and nutations will ensue from the use of a mass which necessitates extra damping mechanisms.

Furthermore, a noiseless gyro, desirable on board of submarines, is hard to build with a fast spinning flywheel. The mass gyro is the most inappropriate angular rate sensor for a strapdown system. If the gyro is mounted directly on the vehicle structure and in this way exposed to the full amount of the angular motions of the vehicle, large torques and severe torquing problems arise. Large errors are the result. Since these increased errors are multiplied by time in the computer, a strapdown system equipped with the conventional mass gyro never can compete in performance with a gimbal suspended platform.

There exist angular rate sensors which utilize quite a different principle, the speed of light. These sensors do not require moving parts and are not subject to Newton's laws of motion since light is weightless. If such a sensor can be built sufficiently accurate and reliable, many of the obstacles associated with the mass gyro are eliminated from the very beginning and many guidance and navigation problems which appear complex or insoluble, like the solid state strapdown system become feasible.

The principle of the rotation sensor, utilizing light, has been established originally by the classical experiments of Michelson, Saginac and others. In the Michelson-Gale interferometer light from a source is split by the beamsplitter into two components. By mirrors the two light components are made to travel in opposite directions around a closed loop and reunited at the beamsplitter, where they are brought to interference. When the system is rotated around an axis normal to the plane of the optical path, with an angular rate, a fringe shift results, which is caused by the difference in traveling time of the two opposite circulating light components.

In the last decade a modification of the original optical rotation sensor has been developed, the ring laser. The ring laser utilizes the tuning properties of a gas laser cavity to measure the difference in traveling time of the two opposite circulating components. The discharge tube of the laser is inserted in the optical ring around which the light is guided by the mirrors and the beamsplitter. Since the length of the resonant cavity of a laser must be equal to some integral number of the emitted wave length, the light waves traveling in opposite directions will be lengthened or shortened when the system is rotated around the normal to the ring plane. The difference in wavelength is associated with a difference in frequency of the light oscillations. This difference is measured by heterodyning of the two opposite traveling light components at the beamsplitter. The beatfrequency then is proportional to the angular velocity to which the system is exposed.

Though the Michelson-Gale interferometer has been known since 1925, it never was applied in guidance and navigation systems. The reason is its huge size which is necessary to obtain sufficient accuracy. Additionally interferometers are extremely sensitive to environmental disturbances and very vulnerable instruments. Minute mirror movements, which may be caused by shock, vibration or temperature variations, give rise to fringeshift and large errors.

The dimensions of the ring laser can be keep smaller to those of the ring interferometer. But the ring laser has other difficulties, like lock-in which arises from coupling between the two laser oscillations taking place in the same cavity, null shift due to direct current used to excite the laser and others.

Therefore, the principle object of the present invention is to improve the accuracy and reliability of the Michelson Gale ring system, by utilizing polarization form conversion in place of the fringe shift. Polarization form conversion of light can be determined with several orders of magnitude better than light intensity changes in a fringe pattern.

Accordingly one of the objects of the invention is to provide a rotation sensitive retarder arrangement which utilizes polarization form conversion to determine rotation in inertial space.

A further object is to provide suitable birefringent dividing and reunifying elements for the polarized light in the ring system.

Another object of the invention is to improve the accuracy of the polarized light conversion detector system by optical noise reduction and in this way render feasible higher amplification.

SUMMARY OF THE INVENTION

A rotation sensitive retarder system comprising an optical loop around which two orthogonal linear polarized light beams are guided in opposite directions. A splitting and reunifying device is utilized in the optical loop for producing two orthogonal components and reunifying the components. Rotation in inertial space produces polarization form convertion in the reunified beam which then is analyzed to determine the extent of the rotation.

DESCRIPTION

General

Figure 1:
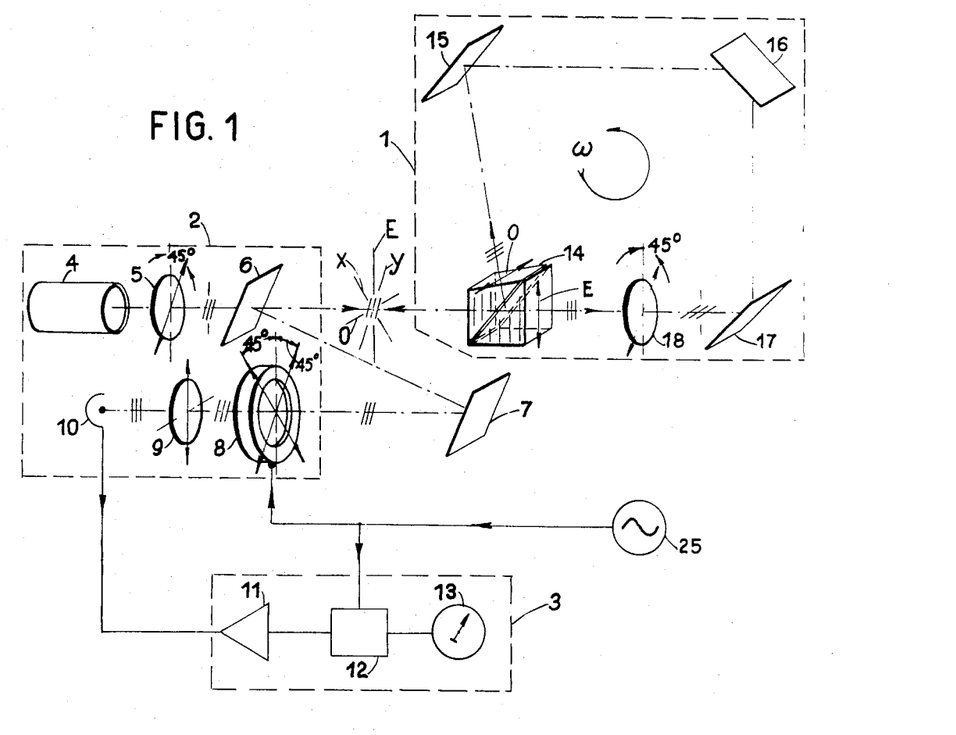
FIG. 1 is a schematic diagram of the total system including the arrangement of the rotation sensitive retarder embodying the invention.

The complete rotation sensitive retarder system, shown in its simplest form in FIG. 1, consists of a rotation sensitive retarder 1, a polarization conversion detector system 2 and a read out system 3.

The retardation of the retarder 1 is a function of the rotation rate $\omega$ in inertial space. The polarization detector 2 determines the polarization-form conversion produced by retarder 1 and the read out system 3 produces the electrical signal, which defines the rotation rate to which the system is exposed and which may be fed into a computer.

To understand the operation of the rotation sensitive retarder system it is essential to be familiar with some of the fundamental definitions in general use in the field of double refraction or birefringence and with some of the properties of birefringent materials.

Most of the elements in retarder 1 and analyzer 2 are linear polarizers and retardation plates. These elements consist primarily of uniaxial birefringent materials so named because of their anisotropy. The indices of refraction and the velocity of light propagation through the birefringent material depend upon the relative orientation of the incident beam to the material and the polarization.

There exists only one axis in a uniaxial crystal along which light of all polarization forms travels with the same velocity. This axis is called the optic axis.

When light travels through the uniaxial crystal perpendicular to the optic axis the refractive index depends on the relative orientation of the plane of polarization with respect to the optic axis. If the electric vector of such a ray is oscillating in a plane normal to the optic axis, the ray is called the O ray (ordinary ray) and the refractive index is $n_o$, the same as along the optic axis. A ray oscillating in a plane parallel to the optic axis is called the E ray (extraordinary ray) and has the refractive index $n_E$.

A refractouniaxial crystal like quartz in which the O ray travels faster than the E ray is called positive birefringent. In a positive crystal $n_E$ is larger than $n_o$.

The birefringence is negative when $n_o$ is larger than $n_E$ like in clacite. In this case the O ray travels slower than the E ray.

A thin sheet cut from uniaxial material parallel to the optic axis is called a retardation plate or retarder. Light incident normally on the surface of such a plate, which is unpolarized or linear polarized in a plane not parallel or perpendicular to the optic axis will be broken up into the two components, the O ray and the E ray. Since the components are traveling with different velocities the two principle axes of the plate are often called also the slow and the fast axes.

As a result of the difference in velocity which causes retardation of one ray relative to the other a difference in the phase relation of the two rays is caused by the retarder. The amount of the shift in phase depends on the birefringence of the material and the thickness of the plate.

If the phaseangle $\delta$ produced by the retarder happens to be 90° of a quarter of a wavelength, circular polarized light will emerge, in case linear polarized light vibrating in a plane which has an azimuth angle of 45° to the optical axis, was incident. With circular polarized light the tip of the light vector traces a circle. Conversely incident circular polarized light will be converted in linear polarized light by a quarter wave plate.

If the thickness of the plate is such that the produced relative phase angle is 180° or half a wave length the plate is called a half wave plate. The emerging beam will be again linear polarized but rotated in its plane of polarization at twice the azimuth angle with respect to the optic axis of the plate. Incident circular polarized light will be reversed by the half wave plate into circular polarized light of opposite handedness.

In the case, the plate is neither a quarter or a half wave plate, elliptical polarized light will emerge when linear polarized light is incident. The tip of the light vector will trace an ellipse, the azimuth of the major axis and the ellipticity of which are a function of the retardation and the relative magnitude of the initial O ray and E ray.

THE DETECTOR

After this general introduction, the operation of the rotation sensitive retarder system may be understood. The light emitted from the light source 4, FIG. 1 is polarized by the polarizer 5 and is oscillating in an azimuth plane rotated 45° to the plane of the paper. The polarization plane of polarizer 5 is indicated by the double headed arrow and the oscillating plane of the light vector or the azimuth by dashmarks. The linear polarized light beam then is propagated through the beamsplitter 6 into the retarder 1. Part of the light returning from the retarder 1 is reflected by the beamsplitter 6 and mirror 7 to the modulator 8, the analyzer element 9 and falls on the photosensor 10.

If the retardation of retarder 1 is zero as is the case when no angular rotation ω exists, the polarization-form of the incident light remains unchanged. Linear polarized light of the same 45° azimuth as originally polarized by polarizer 5 arrives at the modulator 8.

The modulator 8 is assumed to be a Pockel cell or ADP (ammonium dihydrogen phosphate) crystal. The magnitude of retardation of an ADP crystal varies directly proportionally with an applied voltage. In this case an AC voltage from generator 25 is applied, and the amplitude of the voltage is such that the ADP is a quarter wave plate at the maximal voltage.

The optic axes of the ADP crystal, the position of which depend on the sign of the applied voltage, are marked again by double headed arrows. Depending on the sign of the momentary voltage value, the optic axis is either parallel or perpendicular to the polarization plane of the arriving light. Therefore, the ADP crystal cannot convert the linear polarized light oscillating in the 45° azimuth plane.

Because of the 45° angle between the transmittance axis of the analyzer 9 and the plane of polarization of the lightbeam, only half the incident light is transmitted through analyzer 9 to the photocell 10.

When the retarder 1 causes a retardation of 90° i.e. when retarder 1 is a quarter wave plate, then the incident linear polarized light is converted into circular polarized light which is incident on the modulator 8. Since the retardation of the modulator 8 varies between ± 90°, the circular polarized light will be converted periodically into linear polarized light oscillating in a plane 45° to the principle axis of the modulator 8. Consequently the plane of the linear polarized light leaving the modulator 8 will fall either in the plane of the major or minor transmittance axes of the polarizer 9, depending on the sign of the momentary value of the AC voltage applied to the modulator. As a result the light intensity at the photosensor 10 will fluctuate in the period of the AC voltage between a maximum and a minimum intensity and induce an alternating photocurrent of the same frequency.

The photocurrent is amplified by the AC amplifier 11, phase sensitive rectified in rectifier 12 and is indicated by the DC instrument 13 or can be fed into a computer.

When the retardation of retarder 1 is less than 90° then elliptical polarized light will emerge. The modulator 8 will convert only the circular polarized component of the light into linear polarized light which oscillates in the plane of the major or minor transmittance axis of analyzer 9. The AC photocurrent induced in photosensor 10, therefore, is proportional only to the circular polarized light component. The instrument 13 will indicate only how much circular polarized light is produced in the retarder 1.

If for any reason the linear polarized light component is not aligned with the principle axes of modulator 8, more or less than half of the light is transmitted through the analyzer 9 when the applied voltage at the modulator 8 passes through zero. This difference in light intensity then will be converted periodically by the modulator into circular polarized light, half of which is transmitted again through the analyzer 9. As a result the light intensity at the sensor 10 will fluctuate also but this time with twice the frequency of the applied AC voltage. The reason for the double frequency is the fact that half the circular polarized light passes through the analyzer independently of the handedness, i.e. independently of whether the momentary voltage at the modulator 8 is positive or negative.

Since the photocurrent is phase sensitive rectified, the photocurrent of twice the frequency is automatically discarded. Misalignment of the linear polarized light in azimuth, therefore, will not affect the measuring result.

The detection system 2 shown in FIG. 1 presents only one principle example. Many different modifications and variations are feasible and in use in polarimetry, photoelasticity, saccharimetry and other fields. In particular the elements in the system like the light source, modulator, polarizer and analyzer may vary in type and arrangement.

Any kind of light source can be applied in principle in the system like an arc lamp, incandescent light, or some kind of laser. The same is true with the photosensor which may be a photomultiplier, phototube or a solid state sensor. The polarizer 5 and the analyzer 9 can be any kind of Nicol prism or a dichroic polarizer. Finally the ADP modulator 8 may be replaced by some other type like a Kerr cell or a rotating mechanical type modulator.

There exists no reason to describe those possible variations of the detector system because as such each is not individually a subject of the invention.

But it is essential to understand its functions in connection with the rotation sensitive retarder in particular because of the improvements to increase the accuracy which are described later in detail.

The Rotation Sensitive Retarder.

As mentioned, the retarder 1 of FIG. 1 is based on the principle of the ring interferometer. It utilizes, however, polarization conversion in place of fringeshift to determine the difference in traveling time of the two counter circulating light components.

The polarization conversion requires incident polarized light in contrast to the fringeshift method. The linear polarized light in FIG. 1 is produced by polarizer 5 and oscillates in an azimuth plane tilted 45° with respect to the plane of the paper. By the splitting and reunifying device 14, which is a modified polarizer producing both orthogonally polarized components, the incident light beam on retarder 1 is divided into the O ray and the E ray. The O ray travels clockwise around the loop consisting of deflecting mirrors 15, 16 and 17, the E ray counterclockwise. Both rays are combined by the same polarizer element 14, which originally separated them.

However, to render feasible reunification by the same polarizer 14 of the two opposite traveling light components, which are linear polarized in two orthogonal planes, the planes of oscillation of both components have to be rotated 90° in azimuth. Otherwise polarizer 14 will block the transmittance.

This rotation of the planes of oscillation is brought about by the half wave plate 18, the optical axis of which is rotated 45° to the plane of oscillation of the two components. This way the O ray is shifted in the plane of the E ray and vice versa as indicated by the dashed lines.

The exchange in the planes of oscillation of the two opposite traveling beams could be achieved as well in some other way than with a half wave plate. This is well known and, therefore, has not to be discussed any further here.

At the same time the half wave plate 18 provides a parallel plane of incidence for both components with respect to the mirrors 15, 16, 17 of the loop. This way any relative phase shift by reflection between the oscillation of the two components is prevented.

The O ray and the E ray travel on an identical path of equal length in opposite directions around the loop and are reunited to light of the same polarization form as was incident originally, if the system is not exposed to rotation. When linear polarized light oscillating in an azimuth plane of 45° is incident linear polarized light oscillating in the same plane will emerge.

If however, the customary convention in optics is adopted, whereby the observer always looks against the light beam direction, the azimuth of the emerging light has changed 90°. This azimuth change is most obvious if linear polarized light oscillating in a vertical plane is incident. Then linear polarized light, oscillating in a horizontal plane will emerge and vice versa. This 90° shift in azimuth is caused by the half wave plate 18.

Incident circular polarized light, however, emerges unchanged if observed according to the convention in the opposite direction of the emerging light beam. Incident right hand circular polarized light emerges as right hand circular polarized light and so on. This means if the observer looks in the same direction on the incident face of polarizer 14 the sense of rotation of the emerging light vector is reversed.

The Beam Dividing and Reunifying Element

It can be stated, in general, that the retarder 1 like any other retarder splits the incident light into two orthogonal components and reunites them at emergence.

However, to secure reunification in an optical circuit like the retarder 1, special additional conditions have to be met. The components which possess a certain physical dimension have to travel on identical paths with respect to each single ray of the beam. They have to emerge mutually coherent with each other in every part of the beam, otherwise the two components will not reunite but continue to exist independently.

This condition is particularly critical if an incoherent light like an incandescent source is applied. In this case the coherence length is very short and the translational coherence very small. The two components have, therefore, to be superimposed for reunification without too much lateral displacement or difference in path length.

As explained the splitting and reunification element can be any linear polarizer which produces the two orthogonal polarized components, the O ray and the E ray. But none of the known conventional polarizers of this type can be applied in the rotation sensitive retarder circuit without following certain rules.

The best known polarizers producing the two orthogonally polarized components are the Wollaston or the Rochon polarizer. In the rotation sensitive retarder of FIG. 2 a Wollaston polarizer 19 is employed.

Figure 2:
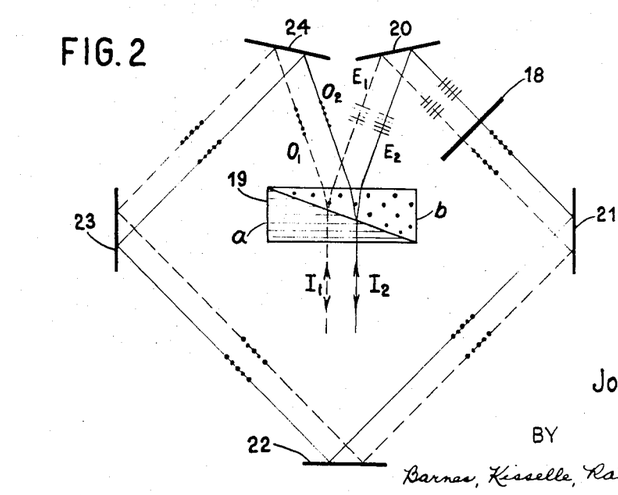
FIG. 2 is a schematic of the rotation sensitive retarder utilizing a Wollaston prism as light splitting and reunifying element.

The Wollaston polarizer consists of two wedges of calcite joined by a layer of Canada balsam. The optical axes of the two calcite wedges are perpendicular to each other as indicated in FIG. 2 by lines and dots. In the first wedge a, the incident beam is separated into the two components O and E. Because of the different indices of refraction which the two rays find in the second calcite wedge b they are deflected at different angles and emerge from the polarizer in different directions. Thus, the emerging O and E ray can be guided by the mirrors 20, 21, 22, 23 and 24 to travel in opposite directions around the loop.

Installed in the loop is the half wave plate 18, the purpose of which has been previously described.

However, besides separating the two orthogonal components, the Wollaston polarizer 19 acts like a wedge shaped retarder, the retardance of which changes if an incident ray moves laterally. This is because the two wedge shaped parts have a 90° difference in the direction of their optical axes. A ray $I_1$ incident at the left of the Wollaston polarizer 19 has to travel, therefore, a longer way in wedge a then in wedge b. As a result, the emerging ray $O_1$ will be delayed against the ray $E_1$.

The opposite happens with the incident ray $I_2$ at the right side of the Wollaston polarizer 19. This ray travels a longer distance in wedge b. As a result the $O_2$ ray will emerge ahead of the $E_2$ ray. Only in the middle of the Wollaston polarizer where the ray travels equal distance in either wedge, will the emerging O and E ray components be in phase.

The difference in phase angle may be increased if the ray after traveling around the loop is transmitted a second time through the Wollaston polarizer. The reunited emerging light beam therefore, is no longer of homogeneous polarization over its entire area. It consists of small stripes of light of different polarization forms, which can not be analyzed by the detector system 2. This dishomogeneity of the emerging beam can be prevented if the point of incidence of each ray over the entire area of the light beam is brought in coincidence with the point of emergence of the returning ray. Then the phase difference caused in the first passage is cancelled in the second. The cancellation is brought about by the effect of the half wave plate 18, which rotates the plane of the E ray and the O ray. In this way the effect of the first transmittance is cancelled by the second if the ray emerges at the same point it was incident originally.

The coincidence of the point of incidence with the point of emergence can be achieved by applying an odd number of mirrors in the loop, as in FIG. 2 in which five mirrors are employed.

If an even number of mirrors is applied the coincidence of all the points of the beam is not feasible because the sides of the returning, with respect to the incident beam are exchanged.

But it is difficult to adjust the mirrors. The birefringence of calcite is large and minimal lateral displacements of the returning beam in the order of one-tenth mm result in a retardation of several wavelengths. This sensitivity to small displacements of the mirrors results in a high vulnerability of the system to environmental noise like shock and vibrations.

Because of this reason a polarizer specially modified for this particular application is employed in the rotation sensitive retarder 1 of FIG. 1. The modified polarizer, is not subject to the change in retardance with lateral beam displacement which is inherent in a Wollaston polarizer.

Figure 3:
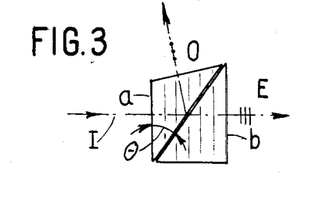
FIG. 3 shows a polarizer prism used in the invention.

The modified polarizer consists of two calcite prisms $a$ and $b$, FIG., 3, the optic axes of which are parallel to the incident face. The two prisms are separated by a small airgap of approximately ½ mm width.

The separation of the two light components is brought about by internal reflection in place of refraction. The critical angle of the O ray is smaller than that of the E ray. The size of the apex angle $\theta$ of prism $a$, FIG. 3, is chosen in such a way that it is larger than the critical angle $\phi_{CO}$ for the ordinary ray O but smaller than the critical angle $\phi_{CE}$ for the extraordinary ray E.

The reason for the difference in the critical angles is the difference of the refractive indices $n_O$ and $n_E$. With calcite, which has an $n_O = 1.658$ and an $n_E = 1.486$ the critical angle for the O ray is:

$$\phi_{CO} = \arcsin(1/n_o) = 37° 51'$$

The critical angle $\phi_{CE}$ for the E ray, however, is larger because $n_E$ is smaller than $n_O$:

$$\phi_{CE} = \arcsin(1/n_E) = 42° 18''$$

If the apex angle $\theta$ lies between these two critical angles, the ordinary ray O is reflected and the extraordinary ray E is transmitted, as indicated in FIG. 3. Normally $\theta$ is chosen to be 39° 40'.

In this invention both components are required. In accordance with the invention, the emergence face for the O ray is cut normal to the beam direction. The prism $a$ thus becomes an isoceles prism, in contrast to prism $b$.

There are two positions of the optical axis feasible in the modified polarizer. The optical axis can be either horizontal or vertical. The vertical position of the optical axis, as indicated in FIG. 3 by lines, is preferable in the rotation sensor application because of the higher efficiency which is of particular importance in those applications in which the further modified form of polarizer is used for the improvement of the sensitivity of the system, described later.

The principle of the modified polarizer is explained best with the help of the reflectance characteristics.

The reflectance curve of the E ray is marked by $E_\parallel$. The two parallel broken lines indicate that the light vector of the E ray oscillates parallel with the plane of incidence. The reflectance curve of the O ray is marked with $O_\perp$ because the light vector of the O ray oscillates perpendicular ($\perp$) to the plane of incidence as can be seen from FIG. 3 in which the planes of oscillation of the E ray and O ray are indicated by dashed lines or by dots.

Figure 4:
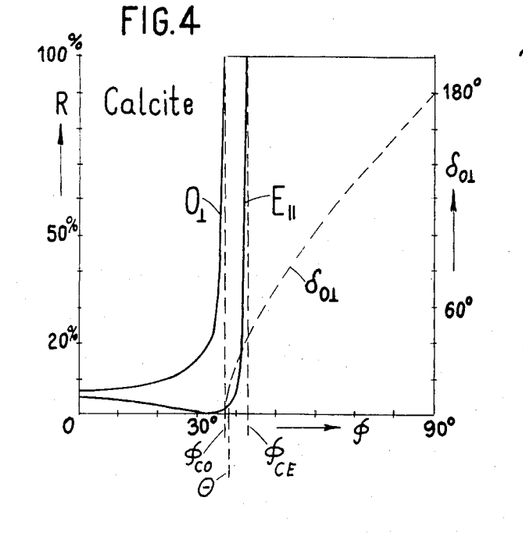
FIG. 4 is the reflection diagram of the polarizer of FIG. 3.

The reflectance curve of the $E_\parallel$ ray starts with approximately $R = 4$ percent reflection. At the polarizing or Brewster angle $\bar{\phi} = 34°$ none of the light of the $E_\parallel$ ray is reflected. At angles larger than $\bar{\phi}$ the reflectance rises again, first slowly but close to the critical angle $\phi_{CE} = 42° 18'$ very steep to 100 percent.

The reflectance curve of the $O_\perp$ ray is a little different. It starts with the higher value of $R = 6$ percent and rises steadily from the start. Near the critical angle $\phi_{CO} = 37° 5'$ it rises steeply to $R = 100$ percent.

As FIG. 4 shows at an angle $\phi = \theta = 39°$ ca. 3 percent of the $E_\parallel$ ray is reflected together with 100 percent of the $O_\perp$ ray. But all the transmitted light at this angle is oscillating in the E plane.

The efficiency of the polarizer can be increased further by decreasing the apex angle $\theta$, i.e. by bringing $\theta$ closer to the critical angle $\phi_{CO} = 37° 5'$.

Another way to improve the efficiency of the polarizer is to use a material of higher birefringence than calcite. Sodium nitrate (Na NO$_3$) is such a material which has refractive indices $n_O = 1.5854$ and $n_E = 1.3369$. This results in a critical angle of $\phi_{CE} = 48° 25'$ and $\phi_{CO} = 39° 12'$. If an apex angle of $\theta = 40°$ is chosen the reflected light of the $E_\parallel$ ray can be reduced to less than 0.3 percent. The efficiency of the polarizer can be raised with Na NO$_3$ to more than 99.7 percent.

Figure 5:
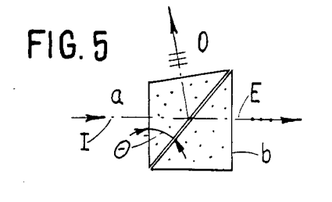
FIGS. 5 and 6 illustrate the polarizer with the optical axis parallel to the end face and the airfilm and the corresponding reflection diagram.

A modified polarizer, the optical axis of which is parallel to the apex line of the prism a and the end surface, as shown in FIG. 5, can also be used in the sensitive retarder 1.

Figure 6:
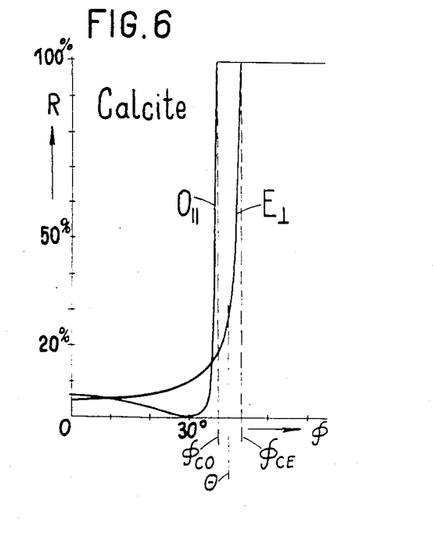

The cause for the high reflectance losses of 27 percent in the polarizer is easily recognizable with the reflectance characteristics of FIG. 6. In the polarizer with the optic axis as shown in FIG. 5, the transmitted E ray is oscillating normal to the plane of incidence, which is the reason for the higher light loss.

The technical data of the different polarizer configurations are compiled in Table 1.

TABLE I

Figure 12:
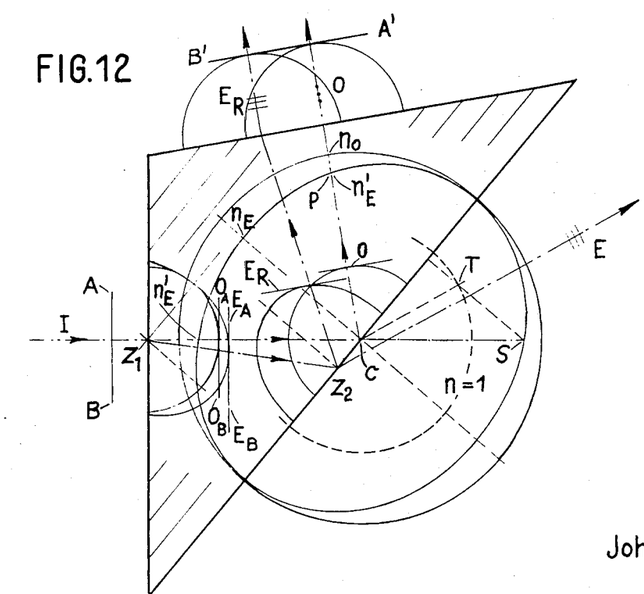
FIG. 12 is a ray diagram of the noise reduction prism used in FIG. 10.

| Configuration | Fig. 3 | Fig. 5 | Fig. 12 | Fig. 3 | Fig. 3 | Fig. 12 |
|---|---|---|---|---|---|---|
| Material | Calcite | Calcite | Calcite | Sodium nitrate | Sodium nitrate | Sodium nitrate |
| Apex angle $\theta$ | 38° | 39°40' | 38° | 40° | 45° | 40° |
| Refractive index: | | | | | | |
| $n_O$ | 1.658 | 1.658 | 1.658 | 1.584 | 1.584 | 1.584 |
| $n_E$ | 1.486 | 1.486 | $n_E' = 1.545$ | 1.3396 | 1.3396 | $n_E' = 1.423$ |
| Critical angle: | | | | | | |
| $\phi_{CO}$ | 37°5' | 37°5' | 37°5' | 39°12' | 39°12' | 39°12' |
| $\phi_{CE}$ | 42°18' | 42°18' | 40°20' | 48°25' | 48°25' | 44°38' |
| Reflectance R, percent | 2.2 | 27 | 6.03 | 0.32 | 5.64 | 1.99 |

The reflectance R for the E ray and O ray is plotted in FIG. 4 as a function of the angle of incidence $\theta$. In the characteristics of FIG. 4 the position of the optical axis is assumed to be vertical as indicated by the lines in FIG. 3. The reflectance R is the percentage of light intensity which is internally reflected at the reflecting surface of prism $a$. The curves have been calculated with the Fresnel equations for reflection.

When discussing the application of the Wollaston polarizer in the optical loop the importance of the homogeneity of polarization-form over the light beam cross section was pointed out. Certain rules have to be applied to preserve polarization homogeneity with the Wollaston. Nevertheless, the Wollaston equipped retarder system remained difficult to adjust and vulnerable to external noise.

This is not true when the modified polarizer is used, as can be realized from FIG. 3 and FIG. 5. The phase relationship between the O ray and the E ray remains unchanged when the incident light beam I moves over the front-face. The optical path-length of the O ray as well as of the E ray remains constant and is independent of the point of incidence.

This is true with respect to the O ray because the cross section of prism $a$ represents an isoceles triangle. The emerging O ray is normal to the surface if the beam I is incident normal to the incidence face.

It is true with respect to the E ray because of the presence of prism $b$ which provides parallelism of the emergence face of the E ray with the incidence face of beam I on prism $a$.

The prism a alone without a prism b could be applied in the loop also to separate and reunify the opposite traveling beams. Then, however, similar limitations would be required as with the Wollaston polarizer as has been previously discussed. The returning rays of the beam must be transferred through the prism at distinct points with respect to their original incidence in order to preserve homogeneity of the polarization. This results in a more difficult adjustment procedure.

It may be mentioned, finally, that the angle of internal reflection in the modified polarizer could be 45° also instead of 40° if the modified polarizer consists of Sodium Nitrate. Then the O ray emerges normal with respect to the incident beam I and the loop can be a square. The prism equipped with an apex angle $\theta = 45°$ has of course, a larger reflectance R as Table I shows, than the prism with $\theta = 40°$.

Effect of Rotation

Up to this point the assumption was made, that the rotation sensitive retarder 1 is not exposed to any rotation in inertial space. In this case the two beams traveling in opposite directions around the loop emerge unchanged without polarization-form conversion. The retardance of retarder 1 in FIG. 1 is zero.

The situation changes, however, if an angular rate around an axis normal to the plane of the loop of retarder 1 exists. Then according to general relativity two observers traveling in opposite directions around a closed path rotating in inertial space will experience a small increase or decrease in clock time. The time difference $\Delta t$ is a function of the speed $c$ of the light, of the rotation rate $\omega$ in inertial space and the area A enclosed by the path of the light:

$$\Delta t = \frac{2A}{c^2}\omega + \frac{2A}{c^2}\omega = \frac{4A}{c^2}\omega \quad (1)$$

Though the two observers travel on an identical path, it appears to them as having covered different path lengths, which are apparently different by the amount:

$$\Delta p = c\,\Delta t = (4A/c)\omega \quad (2)$$

This path difference causes a relative phase difference $\Delta\delta$ between the two opposite traveling light components E and O of:

$$\Delta\delta = \frac{2\pi}{\lambda}\Delta p = \frac{8\pi}{\lambda}\frac{A}{c}\omega \quad (3)$$

where $\lambda$ is the wave length of the light.

The consideration shows that the retarder 1 behaves like a conventional retardation plate. The incident light is broken up into two components. Though both components cover the same physical path length with the speed of light, the effect of the change in clocktime is the same as if they travel with different speed. A similar situation prevails as in a conventional retardation plate in which the components cover the same geometrical distance but with different speed of propagation and hence emerge with a difference in phase angle.

However, the retardance of retarder 1 is not a constant but a function of the rotation rate $\omega$ to which the system is exposed. The situation is similar as with an Pockel cell, the retardance of which is a function of the applied voltage.

If, like in FIG. 1, linear polarized light of a 45° azimuth is incident, the light will be converted, when a rotation rate $\omega$ exists, into elliptical polarized light of the same azimuth and the minor axis of the ellipse formed by the light vector will increase with the sin $\omega$. When sin $\omega = 1$, pure circular polarized light will emerge. Further increase of $\omega$ causes again elliptical polarized light but of an azimuth which is 90° different.

The sense of rotation of the light vector depends on the sense of rotation of the rotation rate $\omega$. A positive $\omega$ produces a right hand circular polarized light, a negative $\omega$ left hand circular polarized light.

In general, however, the ellipse of the produced elliptical polarized light remains very slender, so that it can be assumed without a measurable error that the minor axis of the ellipse increases proportional with $\omega$.

In case circular polarized light is incident into retarder 1 a conversion to linear polarized light takes place. It happens exactly the same as with conventional retarders. Further detailed explanations, therefore, are not necessary here.

Resolution

The problem to be solved with the rotation sensitive retarder is to measure the small rotation rates. The fly wheel gyro, which has been developed over many decades to a high degree of perfection, today is able to measure rotation rates of less than 1/100 per hour. To be able to compete, the rotation sensitive retarder, therefore, should obtain similar accuracy.

Before it can be shown how the accuracy of the rotation rate retarder can be improved we have to determine what smallest rotation-rate the system of FIG. 1 is able to measure.

Experience shows that with a conventional analyzer as shown in FIG. 1, a phase difference $\Delta\delta$ of better than one-tenth second of arc can be detected. If the area A covered by the optical loop of retarder 1 is 0.1m² or 1 foot² and the wavelength $\lambda$ of the applied light is 5,000 A. Then according to equation 3 the smallest rotation rate $\omega$ which can be detected with the system is:

$$\omega = \frac{\lambda}{8\pi}\frac{c}{A}\Delta\delta = 6°/h$$

A rotation sensor of this size would be able to determine half the rotation rate of the earth at 50° latitude. But the sensor is still more than two orders of magnitude less sensitive than a good flywheel gyro.

Noise plays an important role in determining the limit of detectability of a small signal with a photodetector. In the present invention the signal is the light intensity fluctuation at the photosensor 10, which is produced by the circular polarized light component. The circular polarized light is proportional to the rotation rate $\omega$. Noise is generated in the optical part of the system as well as in the photodetector and in the amplifiers.

A main source of the noise is the background light, which limits the sensitivity by statistical fluctuations in light intensity. In this system the linear polarized light component which is remarkably large in comparison with the circular polarized light component has, therefore, to be considered to be the predominant cause of the noise.

In the example above in which a phase angle $\Delta\delta$ of one-tenth second of arc is measured, the ratio of the minor to the major axis of the ellipse traced by the tip of the light vector is $\frac{1}{2} \times 10^{-6}$. This results in a ratio of the average background light intensity $I_{ar}$ produced by the linear polarized light component to that of the periodically fluctuating circular component $\Delta I$ of $\Delta I/I_{ar} = \frac{1}{4} \times 10^{-12}$. Since in any real system a certain quantity of unpolarized light due to defects in the polarizer, dust, depolarization at surfaces exists, the ration $\Delta I/I_{ar}$ is even smaller.

If we assume the noise N produced is $N = K \sqrt{I_{ar}}$ where K is a constant, it is clear that the signal can be increased only to a certain point to obtain maximum efficiency by increasing the initial intensity of the light source.

Obsiously the ratio $\Delta I/I_{ar}$ can be improved in two ways: either by increasing the circular polarized light signal $\Delta I$ or by decreasing the background light $I_{ar}$.

The first method requires a larger or more efficient rotation sensitive retarder.

The second method calls for a reduction of the background light $I_{ar}$ without diminishing the signal at the same time. If it is feasible to decrease the background light, the light source intensity can be increased and this way the signal $\Delta I$ as well.

To reduce the background light evidently a kind of filter is required, which removes linear polarized light but allows the circular polarized light to pass through to the photosensor unobstructed. Such a filter is indeed feasible by utilizing the modified polarizer of FIG. 5 in a way shown in FIG. 7.

Figure 7:
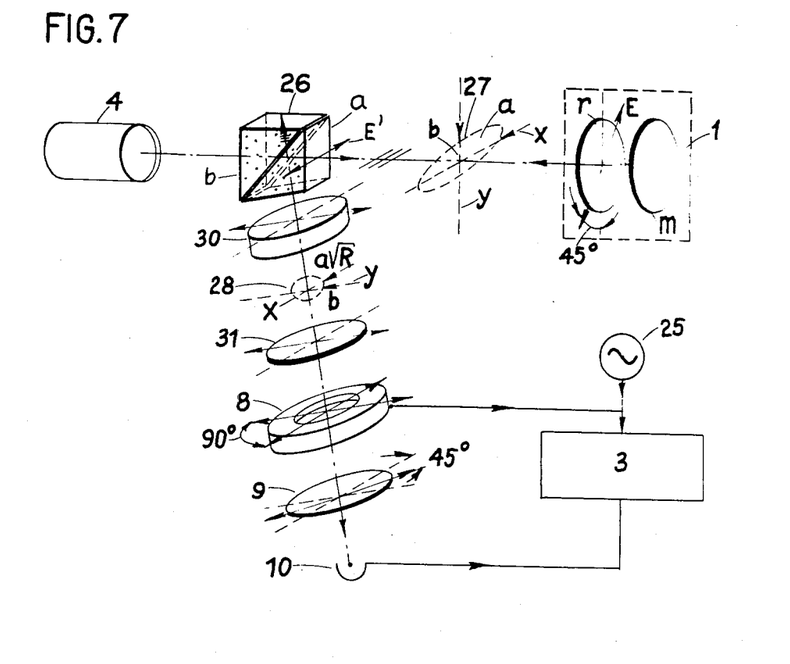
FIG. 7 shows the application of a noise reduction prism in a modified retarder system.

The optical circuit of FIG. 7 resembles largely that of the FIG. 1. Only the polarizer 5, the beamsplitter 6 and the mirror 7 in FIG. 1 are replaced in FIG. 7 by a second additional modified polarizer 26 shown already in FIG. 5. The lightsource 4, the light modulator 8, the analyzer 9 and the photosensor 10 are, however, identical in their function and arrangement in FIG. 1 and FIG. 7. The same is true with the readout system 3 and the AC GENERATOR 25.

In order to obtain a clearer picture the retarder 1 in FIG. 7 is shown as a combination of a conventional retarderplate in front of a mirror m. As explained before, this retarderplate combination is absolutely identical in its functions with that of retarder 1 in FIG. 1, except, of course, that a simpler retarder plate is not sensitive to rotation rate. But for this explanation the sensitivity to rotation is not of importance. For this purpose we can assume the retarder plate r has a small constant retardation.

Like in FIG. 1 the principle axes of the retarder plate r in FIG. 7 are rotated at an angle of 45° with respect to the plane of vibration of the incident linear polarized light. The plane of oscillation of the incident linear polarized light is indicated again by dashed lines. The plane of the E ray oscillation in the retarder plate r of FIG. 7, which is identical to the E ray in the polarizer prism 14 of FIG. 1 is indicated again by the double headed arrow. In both figures the identical x, y coordinate systems are shown. The entire arrangement of FIG. 7 compared with that of FIG. 1 is rotated 45° around the lightbeam axis between lightsource 4 and retarder 1.

The additional polarizer 26 has three functions: first to polarize the light emitted from lightsource 4, second to replace beamsplitter 6 of FIG. 1 and deflect the light returning from retarder 1 into the photosensor 10 and third to reduce the linear polarized light component but deflect all the circular polarized light into the analyzer.

With respect to the first function the polarizer 26 operates in the conventional way and polarizes the light incident from the light source 4. Only the linear polarized light component oscillating in the x plane perpendicular to the plane of the paper is transmitted, but the orthogonal component oscillating in the y plane is deflected and discarded through the upper face of the polarizer 26 as indicated in FIG. 7.

To understand the second and third function of polarizer 26 we have to look at the reflectance characteristics of FIG. 6.

If we assume again a zero retardance of retarder 1, then the returning light is unchanged and linear polarized as it was when incident. This linear polarized light is transmitted through the polarizer 26 unimpeded as the first time, only in opposite direction. However, as can be seen from characteristic $E_\perp = f(\phi)$ (FIG. 6) not all of the light is transmitted. At the angle of incidence $\phi = \theta = 38°$, 27 percent of the light is reflected.

When the retarder 1 causes a small retardance, elliptical polarized light will emerge as is indicated by the ellipse 27 in FIG. 7. Now, we have to realize that elliptical polarized light is composed of two orthogonal linear polarized components which are out of time-phase 90° or a quarter wave length and which are different in their amplitude.

The maximal amplitude of the linear polarized light component oscillating in the x plane represents the major axis a of the ellipse. The amplitude of the major axis a is practically the same as the amplitude of the linear polarized light which was incident on retarder 1 initially.

The maximum amplitude of the linear polarized light component oscillating in the y plane represents the minor axis b of the ellipse as indicated in FIG. 7 at 27. This component is produced by retarder 1.

As before most of the linear polarized light oscillating in the x plane is transmitted through the polarizer 26. Only 27 percent are internally reflected.

Concerning the linear polarized light component of the amplitude b oscillating in the y plane, all 100 percent of the light is reflected into the analyzer as the characteristic $O_\parallel = f(\phi)$ of FIG. 6 reveals.

Figure 8:
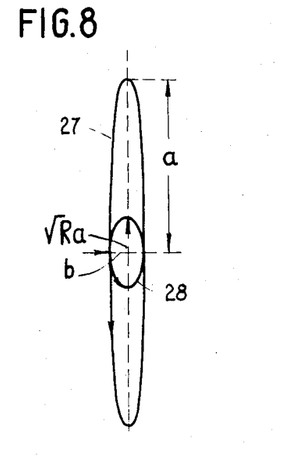
FIGS. 8 and 9 are diagrams illustrating the effect of the noise reduction prism on the elliptical polarized light.

As a result the elliptical polarized light reflected in polarizer 26 into the analyzer contains less of the linear polarized light oscillating in the $x$ lplane but all the light oscillating in the $y$ plane. The tip of the light vector traces an ellipse the major axis $a$ of which is reduced as shown in FIG. 7 at 28 and again in FIG. 8 where both ellipses 27 and 28 are exhibited together. The major axis $a$ of the ellipse is reduced by $\sqrt{R}$ and the ration $\Delta I/I_{ar}$ has been improved by a factor $1/R$.

Instead of operating with the same signal but reduced background light $I_{ar}$, it is feasible also to restore the initial background light intensity by increasing the intensity of the light source and this way the intensity of the signal $\Delta$ *proportionally until the original signal to noise ratio $\Delta I/I_{ar}$ is reestablished.* Then we have optically obtained a gain factor of $1/1R$.

But a similar situation prevails here as in the optical loop application. It has to be made certain that the two components reunite properly to form elliptical polarized light. The situation here is even more complicated than in the loop application. There the reflected O ray and transmitted E ray had to be united after traveling around the loop. Here the O' ray and the reflected part $E'_R$ of the E' ray of polarizer 26 have to reunite. In the loop application the reflected $E_R$ ray in polarizer 14 (FIG. 1) is discarded anyhow because it travels in the wrong direction around the loop.

The first requirement to secure reunification of the O' and the $E'_R$ ray in prism 26a is parallelism of both emerging light components. Parallelisms of the two components prevails only if both encounter the same index of refraction before and after the internal reflection as is the case in an isotropic material like glass.

If we look at FIG. 3 and FIG. 5, we find that this condition exists only in the configuration of FIG. 5, where the optic axis is parallel to the apex line of the prism. Since the refractive index $n_o$ of the O ray is independent of the direction of propagation in the birefringent medium, the angle of incidence and reflection are always equal.

The index $n_E$ of the extraordinary ray E, however, is independent of the direction of propagation only if the direction changes in a plane perpendicular to the optic axis. This happens to be the case in the configuration of FIG. 5 which is applied in the circuit of FIG. 7. Therefore, in prism 26a of FIG. 7 the angle of reflection of the E ray is equal to the angle of incidence and the E ray travels on an identical path with the O ray through the prism.

Though the geometrical pathlength $l$ of both rays is the same, their optical pathlength is different at the amount $l(n_o - n_E)$. This causes a retardation of the O ray with respect to the $E_R$ ray of many waves. To compensate for this retardation the retardation plate 30 is applied, the optic axis of which is rotated 90° with respect to the optic axis of prism 26a as indicated in FIG. 7. The plate 30 may consist of the same birefringent material as polarizer 26. In this case the plate 30 is has to be of nearly equal thickness with the pathlength $l$ of prism 26a.

The difference in thickness is due to the retardation caused by total internal reflection. According to the Fresnel equation the totally reflected O ray is retarded at an angle which increases with the angle of incidence $\phi$ to a maximum amount of $\delta = 180°$ at $\phi = 90°$, starting with $\delta = 0$ at the critical angle $\phi_{co}$. The increase follows a curve similar to the characteristic $\delta_{o\perp} = f(\phi)$ in FIG. 4 for the polarizer of FIG. 3.

Since the retardation is zero at angles of incidence smaller than the critical angle the $E_R$ ray will not be retarded. The result is a phaseshift between the two rays at the emergence.

Figure 9:
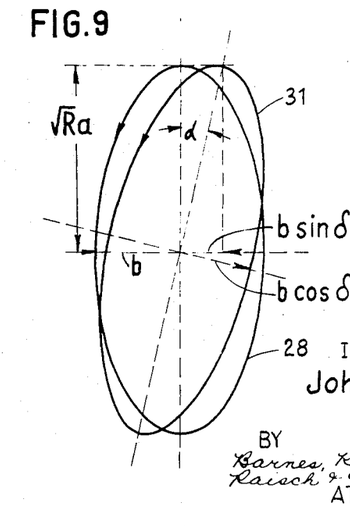

The compensation of the retardation, however, has not to be highly accurate. If a phase angle of $\delta = 30°$ remains, a situation as shown in FIG. 9 prevails. The minor axis $b$ of the ellipse is reduced to $b \cos \delta$ and a component $b \sin \delta$ oscillating in phase with the other component appears. This component together with the O ray causes an azimuth angle $\alpha$.

If the remaining retardation angle is larger, like $\delta = 90°$, then both components are in phase and combine to linear polarized light exclusively. The azimuth angle of the combined linear polarized light increases with the amplitude of $b$. Larger retardation angles like $\delta = 180°$ result again in elliptical polarized light but of opposite handedness etc. The maximum allowable retardation is defined by the coherence length of the light.

The gain factor obtainable with the polarizer configuration of FIG. 5, however, is small even if material of birefringence larger than that of calcite is employed. With calcite the obtainable reflectance is $R = 27$ percent. This results in a gainfactor $1/R$ of only 3.7.

But the gain can be readily increased to any value desired in two ways.

The first way consists in switching an additional partial polarizer 31 in the light path. The transmission axis of this additional polarizer 31 has to be parallel to the $b$ axis of the ellipse. Then all the light oscillating in the $y$ plane is transmitted but the light oscillating in the $x$ plane is reduced further. If the amplitude of the ray oscillating in the $x$ plane is reduced by a factor $f$, the total reduction amounts to $\sqrt{fR}$ which is a reduction in light intensity of $fR$.

The additional polarizer has of course to meet the specification for preserving uniformity of polarization as discussed before. There are many polarizers like dichroic sheet polarizers, which meet these specifications.

The second way to improve the gain consists in decreasing the reflectance factor R of polarizer 26. This can be accomplished only by changing the direction of the optic axis. But the configuration of FIG. 3, which lends itself very well to the loop application can not be applied here, because the O ray will not reunite. The two rays emerge from the prism in different directions.

Figure 11:
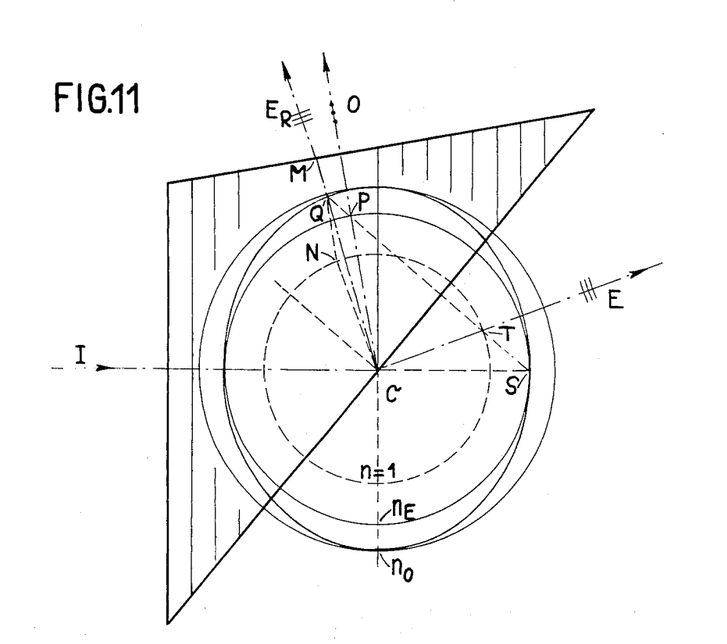
FIG. 11 is a ray diagram of the prism in FIG. 3.

This is illustrated in more detail in FIG. 11, which shows the prism of FIG. 3 in a larger scale. The direction of the optic axis is indicated again in FIG. 11 by thin lines. Additionally the different indices of refraction are shown.

The refractive index $n_o$ of the O ray is independent of the direction of propagation in a birefringent media. If the index $n_o$ is drawn from some point in the crystal as a vector in different directions then the tips of the different vectors $n_o$ are placed on a sphere. In FIG. 11 the cross section of this sphere, which is a circle with the radius $n_o$ around the center $\Gamma$ is shown.

The end-points of the index $n_E$, when drawn in different directions from point $\sigma$ form an ellipsoid of rotation. Along the optic axis the E ray propagates with the same speed as the O ray and the index of refraction for both rays are equal. Perpendicular to the optic axis the index $n_E$ of the E ray i smaller than $n_o$ in a negative crystal like calcite or sodium nitrate. The cross section of the ellipsoid falling in the plane of the paper in FIG. 11, therefore, is an ellipse, the major axis of which coincides with the optic axis. The circle with the radius $n_O$ touches the ellipse outside. A circle with the radius $n_E$ touches the ellipse inside.

To find the deviation of the ray $E_R$ caused by the difference in the indices before and after reflection the simple well known method of tracing a ray when crossing a boundary separating two optically transparent media of different refractive indices is applied. A line perpendicular to the reflecting surface from the point of intersection P of the O ray with the $n_E$ circle is drawn in FIG. 11. This line intersects the ellipse at point Q. The line connecting the center $\sigma$ with Q then is the direction of the reflected $E_R$ ray which emerges at point M. The distance from $\sigma$ to Q represents the new refractive index $n_E'$ which the $E_R$ ray meets after the reflection. In this case the index $n_E'$ is only a little smaller than $n_O$ as FIG. 11 shows.

When emerging from the prism into the air the $E_R$ ray undergoes an additional refraction. The direction of the $E_R$ ray in air can be found by the same method as before. From point Q the normal (dashed line) on the emergence face of $E_R$ is drawn, which intersects the dashed circle $n = 1$ at N. The line from $\sigma$ to N then indicates the direction of the ray $E_R$ in air. The ray $E_R$ in air is found by drawing a line parallel to $\sigma - N$ through point M.

Here however, we have to realize that a double refracting material is involved. Actually the $E_R$ ray does not emerge exactly from point M but is bent away from the direction indicated in FIG. 11. the divergence amounts to about 10°.

The reason for the parallel displacement of the $E_R$ ray is explained in more detail later. Here no further investigation is necessary. In the loop application the $E_r$ ray which is traveling in the wrong direction has to be discarded anyhow, and the construction of FIG. 11 proves sufficiently that the configuration of FIG. 3 does not lend itself to noise reduction. The two rays can never reunify.

The direction of the transmitted E ray after emergence from the prism can be ascertained with a similar construction. A perpendicular line to the reflecting surface through the intersecting point S of the ray I with the circle $n_E$ is drawn. This line intersects the circle $n = 1$ for air in point T. The line from $\sigma$ to T is the emerging E ray.

The construction of FIG. 11 shows already the way, how the divergence between the $E_r$ ray and the O ray can be prevented. The optic axis has to be rotated in a position in which the refractive indices encountered by the $E_R$ ray before and after the internal reflection are equal.

This position is illustrated in FIG. 12. The configuration of FIG. 12 is identical with that of FIG. 11 except that the optic axis is parallel to the reflecting surface instead of parallel to the incidence face. This way the minor axis of the index ellipse for the E ray becomes perpendicular to the reflecting surface and the points P and Q of FIG. 11 coincide. Because of the symmetry of the ellipse the $E_R$ ray always finds the same refractive index $n_E 40$ before and after the internal reflection. Therefore, the angle of incidence and the angle of reflection will be equal at any angle of incidence of the I ray as FIG. 12 illustrates.

It is of course feasible also to rotate the optic axis in the perpendicular position to the reflecting surface to obtain equality between the angle of incidence and the angle of reflection for the $E_R$ ray. But in the position in which the major axis of the index ellipse is perpendicular to the reflecting surface, the refractive index $n_E$ of the $E_r$ ray is larger than in the parallel position. This results in a larger reflectance R. The configuration of FIG. 12 is preferable, therefore.

But in FIG. 12 the ray I is not incident into the crystal perpendicular to the optic axis. As a result double refraction occurs. The O ray passes straight through, while the E ray is deflected away from the normal, because under this condition the E ray does not obey the ordinary sine-law of refraction.

The reason for this bending away of the E ray by double refraction at the surface of a uniaxial crystal is readily explained by Huygens' principle of secondary wavelets. In a uniaxial crystal two wave faces are formed, the ordinary wave surface and the extraordinary wave surface. A wave surface is a wave front completely surrounding a point source of monochromatic light. The distance of the wave surface from the point source at a certain time is defined by the speed of the light propagation which is inversely proportional to the index of refraction.

Because of the refraction index $n_O$ of the ordinary ray is independent of the direction of light propagation the wave surface of the ordinary ray is a sphere.

Since the index of refraction $n_E$ of the extraordinary ray changes with the direction of propagation in the way explained before, the extraordinary wave surface is an ellipsoid of revolution. The wave surfaces are obtained for the O ray by rotating a circle about the optic axis. The radius of the circle is $1/n_O$. The wave surface of the E ray is obtained by rotating an ellipse with the semi axis proportional to $1/n_O$ and $1/n_E$ about the optic axis which is parallel to the semi axis $1/n_O$. These circles and ellipses are shown in FIG. 12 with the centers $Z_1$ and $Z_2$. In calcite and sodium nitrate the ellipsoid touches the enclosed sphere at the two points where the optic axis passes through the surface.

The deflection of the extra-ordinary ray in the crystal is obvious if Huygens' construction is applied. We assume the point $Z_1$ on the surface of the crystal in FIG. 12 becomes the center of wavelets, which are spherical for the O ray but ellipsodial for the E ray. A wavefront A−B incident parallel to the surface of the crystal will be dissolved into two wave fronts, into the wavefront $O_A-O_B$ for the O ray and into wavefront $E_A-E_B$ for the E ray. The wavefront $O_A-O_B$ is tangent to the sphere, the wavefront $E_A-E_B$ is tangent to the ellipsoid. Both wavefronts proceed always parallel to the surface but with different velocities.

By connecting the center $Z_1$ of the wavelet with the point of tangency of the wavefront $O_A-O_B$ and $E_A-E_B$ the direction of the O ray and of the E ray is obtained. As can be seen from FIG. 12 the E ray is deflected away from the O ray. What actually happens may be described as follows: The wavefront of the E ray travels in a direction normal to the surface of the crystal but any limited portion of it bears away constantly to one side. As a result the E ray emerges at point $Z_2$ instead of point $\sigma$.

The direction of propagation of the E ray in air of course is not affected by the double refraction. This direction can be found, therefore, in the same way as explained with FIG. 11. The emerging E ray is only displaced laterally but unaffected by the double refraction in its direction of propagation.

After reflection, the $E_R$ ray continues to diverge from the O ray as shown in FIG. 12 by the ellipsoidal wavelet around the center $Z_2$. The direction of the $E_R$ ray is obtained by connecting $Z_2$ with the point of tangency of the wavefront of $E_R$. This wavefront is perpendicular to the direction of the O ray. The result of the divergence between the two rays is a separation between their points of emergence. But at emergence the $E_R$ ray is bent back in a direction parallel to that of the O ray.

The construction of FIG. 12 demonstrates that by placing the optic axis parallel to the reflecting surface of the prism, parallelism between the emerging O ray and $E_R$ ray can be achieved. However, now the rays emerge at points some distance apart. Again this distance of separation is to large for a reunification of the two rays.

Figure 10:
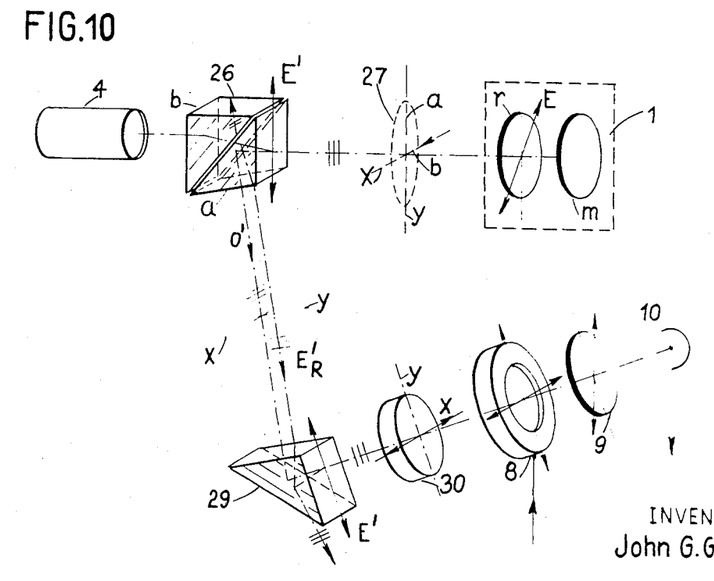
FIG. 10 shows a further modified form of the retarder system using another noise reduction prism.

Fortunately the parallel separation can be readily compensated for with an extra plate the optic axis of which has an angle with its surface or by a second prism 29 as shown in FIG. 10. The second prism 29 is identical in shape, material and size with prism 26a. It is turned in a position in which the parallel displacement of the $E_R$ ray is opposite to that of prism 26a. This way the $E_R$ ray and the O ray emerge from prism 29 on the same identical path and can, therefore, reunite to form elliptical polarized light. The same analyzing unit described before, consisting of the Pockel cell 8, the analyzer 9 and the photosensor 10 can be applied. Besides of reuniting the two light components the second prism 29 produces a further reduction in background light which can be obtained if an extra compensating plate is used instead.

The retardation caused by the two prisms is compensated again by the retarder plate 30. It may be mentioned additionally that the major axis of the ellipse 27 in FIG. 10 is rotated 90° compared with FIG. 7. This is caused by the different direction of the optic axis in polarizer 26 which requires a rotation of 90° in the plane of oscillation of the originally incident linear polarized light.

As Table I shows the prism of FIG. 12 when cut from sodium nitrate has a reflectance of only $R = 1.99$ percent $= 1/50$. The two prisms in series in the circuit of FIG. 10 reduce, therefore, the background light to $1/R^2 = 1/2,500$. This reduction can be increased to any desired value by inserting an additional partial sheet polarizer as shown in FIG. 7 or by obscuring part of the parallel separated $E_R$ ray between prism 26a and 29. With the light intensity of the light source adjusted to the maximum intensity the background light at the photosensor can be decreased to a value of the optimum signal to noise ratio. This is the case if the background light vector is not larger than the maximum light vector which can be produced by the largest possible rotation rate to which the system may be exposed.

With the simple rotation sensitive retarder system of 1 square foot loop area, described before, a smallest rotation rate of 6°/h could be measured. By the addition of the noise reducing prism the sensitivity can be increased by several orders of magnitude. Thus the disclosed principle of the rotation sensitive retarder system lends itself very well to an accurate rotation rate sensor which is able to compete in accuracy, size and simplicity with the flywheel gyro.

Summary

The rotation sensitive retarder system embodying the invention utilizes polarization-form conversion to determine rotation in inertial space. The basic part of the disclosed rotation sensitive retarder system consists of an optical loop around which two orthogonal linear polarized light beams are guided in opposite directions (FIG. 1, 1). The polarized light incident into the loop is divided by a splitting and reunifying device (FIG. 1, 14) into said two opposite traveling orthogonal components and reunited by the same device at emergence from the loop.

To render feasible the reunification by the splitting and reunifying device the plane of polarization of both components is shifted 90°. The shift of planes can be achieved with a half wave plate (FIG. 1, 18).

For the splitting and reunification of the light beam every polarizer producing the two orthogonal components can be employed. With a conventional polarizer, like a Wollaston, the homogeneity of polarization is not preserved, however, unless certain rules are applied. A defined number of mirrors has to be employed in the loop so that every single ray of the light beam emerges at the same point of the polarizer at which it was incident originally.

The restrictive rules which aggravate initial adjustment can be avoided if a splitting and reunifying device which is a modified reflecting polarizer, able to produce both orthogonal components, is applied. The modified polarizer (FIG. 3 and FIG. 5) consists of two prisms the cross section of the first of which is an isosceles triangle. Then the ordinary ray emerges from the surface of the prism at the same angle as it was incident. In this way homogeneity of polarization of the reunified light emerging from the loop is secured.

Beyond the loop application a further modified reflecting polarizer can be employed to improve the signal to noise ratio and thus achieve optical amplification. In this application the optical axis must be arranged in a direction which secures parallelism of the emerging ordinary ray with the reflected part of the extraordinary ray. There are three positions of the optic axis feasible to achieve parallelism.

The highest gain is achieved when the optic axis is parallel to the reflecting surface and perpendicular to the apex line of the prism (FIG. 12). When this prism is applied an extra compensating plate the optic axis of which makes an angle with its surface or a combination of two identical prisms in series is required (FIG. 10). The second prism must be rotated in a position in which it compensates the parallel displacement between the two light components caused by the double refraction of the first.

By employing the properly designed reflecting polarizer in the optical loop as well as for optical amplification a reliable, highly accurate rotation sensor can be built, (FIG. 7 and FIG. 10).

I claim:
1. A rotation sensitive system comprising
   a source of light, means for polarizing said light, a splitting and reunifying device for splitting a beam of polarized light from said source into two orthogonal linear polarized components, comprising an ordinary ray and an extraordinary ray, and for reunifying said components, and a plurality of mirrors positioned in a manner such as to produce identical closed paths for said components of light in opposite directions, said device being positioned in said paths, means in said paths for changing the planes of polarization of the emerging orthogonal components by 90° for reunification, and means for analyzing the polarization form conversion of said light after it passes through said loop and emanates from said splitting and reunifying device.

2. The combination set forth in claim 1 wherein said means for changing the planes of polarization comprises a retarder like a half wave plate.

3. The combination set forth in claim 1 wherein said splitting and reunifying device produces the two orthogonal components by reflection and comprises two birefringent monoaxial prisms separated by a gap filled with a medium of smaller optical density preferably air, at least the first prism being isosceles and from which the ordinary ray emerges at the same angle as it was incident thereto.

4. The combination set forth in claim 3 wherein the optic axes of said two prisms are perpendicular to the incident light from the source and perpendicular to the apex line.

5. The combination set forth in claim 3 wherein said prisms have surfaces from which the ordinary and extraordinary rays emerge at equal angles.

6. The combination set forth in claim 1 wherein said splitting and unifying device comprises a Wollaston polarizer.

7. The combination set forth in claim 6 wherein said plurality of mirrors comprises an odd number of reflections.

8. The combination set forth in claim 1 including a second device externally of the closed path and in the path of the polarized beam for passing the light from said source to the splitting and reunifying device and for filtering out the major portion of the component of light returning from the splitting and reunifying device which is in the same direction of polarization as the linearly polarized light passing to said splitting and reunifying device and for passing all of the other components of light returning from the splitting and reunifying device.

9. The combination set forth in claim 8 wherein said last-mentioned device comprises an element wherein the optic axis is positioned in such a way that the two components of light emerge parallel.

10. The combination set forth in claim 9 including an additional filtering prism or partial polarizer in the path of light emanating from said last-mentioned device to further reduce the background light.

11. The combination set forth in claim 8 wherein said means for polarizing said light and said second device comprises two birefringent monoaxial prisms separated by a gap filled with a medium of smaller optical density preferably air, at least the prism which receives the light from the splitting and reunifying device being isosceles from which the ordinary ray emerges at the same angle at which it was incident thereto.

12. The combination set forth in claim 9 wherein said first prism of said second device has its optic axis other than parallel to the surface receiving light from the source and other than perpendicular to the apex line.

13. The combination set forth in claim 12 wherein the optic axis of said other prism of said second device is parallel to the surface receiving light from the source and parallel to the apex line.

14. The combination set forth in claim 13 including an additional retarder device in the path of the light emanating from the second device toward the analyzing means for further filtering out a portion of the one component of light.

15. The combination set forth in claim 12 wherein the axis of said other prism of said second device is parallel to the internal reflecting surface at the air gap and perpendicular to the apex line.

16. The combination set forth in claim 15 including another device in the path of the light passing to the analyzing means from the second device for compensating for parallel separation caused by said second device.

17. The combination set forth in claim 12 wherein the axis of said other prism of said second device is perpendicular to the internal reflecting surface at the air gap and perpendicular to the apex line.

18. The combination set forth in claim 17 including another device in the path of the light passing to the analyzing means from the second device for compensating for parallel separation caused by said second device.

19. For use in a rotation sensitive system, the combination comprising a splitting and reunifying device for splitting a beam of polarized light into two orthogonal linear polarized components, comprising an ordinary ray and an extraordinary ray, and for reunifying said components, and a plurality of mirrors positioned in a manner such as to produce identical closed paths for said components of light in opposite directions, said device being positioned in said paths.

20. The combination set forth in claim 19 including means in said paths for changing the planes of polarization of the emerging orthogonal components by 90° for reunification.

21. The combination set forth in claim 19 wherein said splitting and reunifying device produces the two orthogonal components by reflection and comprises two birefringent monoaxial prisms separated by a gap filled with a medium of smaller optical density preferably air, at least the first prism being isosceles and from which the ordinary ray emerges at the same angle as it was incident thereto.

22. The combination set forth in claim 21 wherein the optic axes of said two prisms are perpendicular to the incident light from the source and perpendicular to the apex line.

23. A splitting and reunifying device for use with an optical loop for splitting a beam of polarized light from said source into two orthogonal linear polarized components, comprising an ordinary ray and an extraordinary ray, and for reunifying said components which comprises two birefringent monoaxial prisms separated by a gap filled with a medium of smaller optical density preferably air, at least the first prisms being isosceles and from which the ordinary ray emerges at the same angle as it was incident thereto.

24. The combination set forth in claim 23 wherein the optic axes of said two prisms are perpendicular to the incident light from the source and perpendicular to the apex line.

25. The combination comprising
a source of light,
a retarder for receiving light and returning it in modified condition,
and a device between said source and said retarder for passing the light from said source to said retarder and for filtering the major portion of the component of light returning from the retarder which is in the same direction of polarization as the light passing to the retarder and for passing all the other component of light returning from the retarder.

26. The combination set forth in claim 25 wherein said last-mentioned device comprises an element wherein the optic axis is positioned in such a way that the two components of light emerge parallel.

27. The combination set forth in claim 25 including an additional filtering prism or partial polarizer in the path of light emanating from said last-mentioned device to further reduce the background light.

28. The combination set forth in claim 25 wherein said means for polarizing said light and said device comprises two birefringent monoaxial prisms separated by a gap filled with a medium of smaller optical density preferably air,
at least the prism which receives the light from the splitting and reunifying device being isosceles from which the ordinary ray emerges at the same angle at which it was incident thereto.

29. The combination set forth in claim 25 wherein said first prism of said device has its optic axis other than parallel to the surface receiving light from the source and other than perpendicular to the apex line.

30. The combination set forth in claim 29 wherein the optic axis of said other prism of said device is parallel to the surface receiving light from the source and parallel to the apex line.

31. The combination set forth in claim 30 including an additional retarder device in the path of the light emanating from the device toward the analyzing means for further filtering out a portion of the one component of light.

32. The combination set forth in claim 29 wherein the axis of said other prism of said device is parallel to the internal reflecting surface at the air gap and perpendicular to the apex line.

33. The combination set forth in claim 32 including another device in the path of the light passing to the analyzing means from the device for compensating for parallel separation caused by said device.

34. The combination set forth in claim 29 wherein the axis of said other prism of said device is perpendicular to the internal reflecting surface at the air gap and perpendicular to the apex line.

35. The combination set forth in claim 32 including another device in the path of the light passing to the analyzing means from the device for compensating for parallel separation caused by said device.

36. The method of determining rotation in inertial spacing which comprises
splitting a beam of light into two orthogonal polarized components comprising an ordinary ray and an extraordinary ray,
directing said ordinary ray and said extraordinary ray in identical opposed closed paths whereby any rotation in inertial space will be evidenced by a phase shift of the two polarized form components,
reunifying said ordinary ray and said extraordinary ray after passage through said closed paths,
and analyzing polarization-form conversion of said reunited rays.

37. The method set forth in claim 36 including the step of splitting said reunited beam of light and filtering out the major portion of one of the components of light while permitting the light in the orthogonal plane of polarization to pass.

* * * * *